United States Patent [19]

Schultz

[11] Patent Number: 5,695,654
[45] Date of Patent: Dec. 9, 1997

US005695654A

[54] APPARATUS AND METHOD FOR DRAINING, CLEANING, AND FILLING AN AQUARIUM

[75] Inventor: Mark A. Schultz, Vista, Calif.

[73] Assignee: Lee's Aquarium & Pet Products, San Marcos, Calif.

[21] Appl. No.: 596,712

[22] Filed: Feb. 5, 1996

[51] Int. Cl.⁶ .......................... A01K 63/04; F04F 10/02
[52] U.S. Cl. .................. 210/780; 210/169; 210/416.2; 210/470; 119/264; 137/140
[58] Field of Search ........................ 210/767, 780, 210/169, 416.2, 470; 15/1.7; 119/264; 137/140

[56] References Cited

U.S. PATENT DOCUMENTS

| | | | |
|---|---|---|---|
| 2,828,019 | 3/1958 | Lambertson | 210/169 |
| 2,899,063 | 8/1959 | Ellis, Jr. | 210/169 |
| 2,956,507 | 10/1960 | Hutchinson | 210/169 |
| 3,225,930 | 12/1965 | Willinger | 210/169 |
| 3,304,564 | 2/1967 | Green et al. | 210/169 |
| 4,233,702 | 11/1980 | Zweifel | 210/169 |
| 4,610,784 | 9/1986 | Reyniers | 210/169 |
| 4,943,211 | 7/1990 | Boegh | 210/169 |
| 5,048,140 | 9/1991 | Wu | 210/169 |
| 5,269,338 | 12/1993 | Figas | 210/169 |
| 5,279,730 | 1/1994 | Chen | 210/169 |

Primary Examiner—Robert Popovics
Attorney, Agent, or Firm—John J. Murphey; Murphey Law Offices

[57] ABSTRACT

Apparatus for use in draining, cleaning and refilling an aquarium tank including an elongated flexible hose having first and second opposite ends, a tube including an upper distal end for connection to the first end of the flexible hose, and a lower distal end adapted to be immersed in the aquarium tank such that the lower end may be placed near the bottom of the aquarium tank, a first device attachable to the second end of the flexible hose and for connection to a flowing water source for creating a flow of water from the tank through the tube and the flexible hose, and a grille, defined by a chamber and including a plurality of apertures formed in the walls thereof that are narrower than the width of the gravel particles, the grille and chamber attached to the lower distal end of the tube for contact with the gravel for moving the gravel about the floor of the tank such that the gravel particles are forced by the movement to bump and rub against each other outside the tube to dislodge the sediment and impurities that have gathered therewith, and wherein the sediment and impurities are swept by the water flow through the apertures into the chamber, up the tube and through the hose for discard without the entrance of gravel into the tube or hose.

34 Claims, 5 Drawing Sheets

APPARATUS AND METHOD FOR DRAINING, CLEANING, AND FILLING AN AQUARIUM

BACKGROUND OF THE INVENTION

1. Field of the Invention

This invention pertains to the field of pets and pet supplies. More particularly, the invention pertains to a compact device for draining, cleaning, and filling an aquarium, especially one that has gravel on the bottom, and that performs such services with the least disturbance to the flora and fauna living therein.

2. Description of the Prior Art

What child has not watched, in absolute fascination, the movement of brightly colored fish swimming about in an aquarium? The fascination of fish in an aquarium has spread to the point that they are seen gracing business offices and restaurants. Fresh water fish and salt water fish display distinctive colors under a variety of lights and it is rare that such displays do not entertain onlookers.

As in most instances, however, a lot of work goes into the beautification of the aquariums. Fish are like humans in that they survive by eating food, and their normal digestive activity requires that they periodically void their bodies of the waste materials. In an effort to remove this waste, filters are submerged in aquariums through which water passes. In many cases, an underwater filter is placed on the bottom of the aquarium tank over which a layer of gravel particles is arranged. The waste material falls to the bottom of the tank onto the gravel, and the general flow of water is directed downward, through the gravel, to bring fresh water into contact with the waste so that some of it is digested by natural processes.

Depending upon the size of the aquarium and the type and number of inhabitants maintained therein, it is often necessary to physically remove the sediment and impurities from the gravel and, at the same time, clean the interior walls and glass of the thin film of plant life that grows thereover which gradually renders the glass opaque. As a general rule, in cleaning aquariums, not more than about one-third of the water should be removed to prevent the shock of the new, make-up water from adversely affecting the inhabitants.

A number of processes and apparatuses have been developed for performing the draining, cleaning and refilling work. U.S. Pat. Nos. 1,826,829; 1,930,284; 1,950,172; 2,112,290; 2,741,997; 2,956,507; 3,304,564; 3,734,853; 3,738,620; 3,741,158; and, 4,610,784 have been issued in an effort to make this cleaning process easier for the serious aquarium aficionado. The closest prior art appears to be the Reyniers patent (U.S. Pat. No. 4,610,784) and the Green, et al patent (U.S. Pat. No. 3,304,564).

In Reyniers, a flexible hose is provided having opposite ends, where one end is connected to one end of a larger diameter tube. The other end of the tube is placed adjacent the gravel covering the floor of the aquarium. Means are provided, specifically a valve and a fitting, for connection to the end of a faucet that contains a venturi section. When the faucet is turned on, one position of the valve causes the water running out of the faucet to draw water in through the hose from the aquarium for discharge into the drain below the faucet. This water flow causes gravel to be picked up and swept into the gravel tube where, supposedly, the gravel particles "churn" and rid themselves of sediment and fish droppings that are swept into the hose and ultimately discharged in the drain while the gravel drops back to the bottom of the aquarium.

This product has some serious disadvantages that has prevented its wide spread acceptance. It takes a rather significant flow of water to draw the gravel up into the gravel tube. Usually, by the time the user has established the appropriate flow, much of the water volume in the aquarium tank has been drained and the process must be stopped so that the one-third volume change rule is not violated. In addition, when the proper flow has been achieved, the gravel particles do not grind together with sufficient force to rid them of all the sediment and impurities, so the cleaning cycle is not fully completed. After some of the gravel particles do churn in the gravel tube, there is nothing to cause them to fall back to the floor of the aquarium except if the upward flow in the gravel tube is interrupted. The continual starting and stopping of the flow in the tube causes sediment and impurities to be stirred up at the bottom of the tank and this disturbs the inhabitants. Finally, the bottom of the gravel tube is flat. In order to cause sufficient velocity of water upward in the gravel tube, the flat end of the tube must be placed almost fully against the gravel. When this occurs, some gravel is swept up into the gravel tube. The slightest lifting of the tube from the floor of the tank will allow more water to enter the tube and lower the upward velocity. This allows the gravel to fall out of the tube without churning to rid itself of sediment and impurities. For best results in using this apparatus, one must have a very steady hand as well as be able to manipulate valves, hoses, and the gravel tube swiftly and with great care. These traits are not always present in those who care for aquariums.

SUMMARY OF THE INVENTION

This invention is the result of tests which show that separating sediment and impurities from gravel must take place totally outside the gravel tube and in the presence of an uninterrupted flow of water up through the discharge hose. This is accomplished in this invention by removing the separation action of sediment and impurities out of the gravel from the gravel tube, and locating it outside the tube while simultaneously providing an uninterrupted flow of water past the gravel into the tube and out the hose.

A frame-supported, tooth-shaped grille is provided that has formed therein a plurality of openings to allow passage of water, sediment and impurities from the tank into the discharge hose but not the gravel. The operator manipulates the tube to cause the grille to push the gravel about the floor of the tank so that gravel particles physically bump against each other and their surfaces grind together to break off the sediment and impurities. The continual flow of water into the grille, through that part of the grille not in contact with the gravel particles, allows the separated sediment and impurities to be swept through the grille, up the tube and out the hose. It is no longer necessary to refer to the tube as the "gravel" tube because the grille prevents any entrance whatsoever of gravel into the tube or the hose. All intercontact between gravel particles takes place outside the tube and the tube is merely used as a handle to manipulate the grille about the floor of the aquarium tank.

The grille is singular in design and contains screens that are arranged at angles to each other. This design presents one screen or portion thereof in contact with, or exposed to, the aquarium water while one or more other screens are being used to plow the gravel particles along the floor of the aquarium. This is totally different from the flat-ended gravel tube of the Reyniers patent and the Green, et al patent, and clearly provides a more constant flow of aquarium water upward through the tube while the operator is physically causing the particles to bump and grind together by the power of his/her hand.

In addition, this invention comes in three embodiments; the first embodiment is made up of a length of flexible hose having first and second opposite ends, a tube including an upper end for connection to the first opposite end of the flexible hose, and a grille comprising screens arranged at angles to each other for attachment to the lower end of the tube for contact with the gravel along the bottom of the aquarium tank. A first means is provided for connecting the second end of the elongated flexible hose to a water source, such as a faucet, including a venturi section for causing a vacuum in the flexible hose to start the draining process. This embodiment may also include a second means for causing selective and alternative flow of water from the aquarium tank through the tube and the flexible hose to a drain and a flow of water from the water source through the elongated flexible hose to the aquarium tank for refilling the aquarium tank.

The second embodiment does not use the first or second means, but provides the cleaning action when the other or second end of the flexible hose is placed lower than the first end and a natural siphon action started, such as by creating a partial vacuum in the flexible hose. The water, with entrained sediment and impurities, is removed from the tank by this siphon action.

The third embodiment of the invention is the inclusion of a water pump, in place of the natural siphon, and connection of the pump inlet to the second end of the flexible hose such that, when the pump is turned on, water, sediment and impurities are pumped through the grille, tube, and hose to be discharged by the pump outlet in a drain or other place.

All of these embodiments utilize the novel grille at the bottom end of the tube to physically cause separation of the sediment and impurities from the gravel outside the tube.

The invention comprises an elongated flexible hose having opposite terminal ends, a tube including an upper end for connection to one of the opposite ends of said flexible hose, and a lower end for connection to a grille to be immersed in the aquarium tank so that the grille may be placed adjacent the bottom of the aquarium tank for contact with the gravel to move the gravel about such that, when a vacuum or water-drawing action is maintained in the tube and hose to remove water from the aquarium, the gravel particles are forced by movement of the grille to bump and rub against each other to dislodge the sediment and impurities (fish droppings) therefrom. The sediment and droppings thereafter are swept by the water flow through the openings in the grille up the tube and through the hose to a drain without the entrance of gravel into the tube or hose. Part of the grille is always exposed to the water in the aquarium tank to facilitate the flow of water up the tube.

The main difference between the embodiments is the manner in which the water is caused to drain out of the aquarium tank through the flexible hose. In the first embodiment, the water-drawing action is caused and maintained by suction generated in the venturi section of a fitting attached to a water faucet. This embodiment may also include a means for refilling the aquarium. In the second embodiment, it is caused and maintained by natural siphoning action. And in the third embodiment, it is caused and maintained by a mechanical pump.

Accordingly, the main object of this invention is a highly functional device for draining, cleaning and refilling an aquarium tank and, in cleaning the tank, to cause the gravel particles covering the floor thereof to be pushed about to bump and grind together to dislodge sediment and impurities, including fish droppings, from the particles while providing an uninterrupted flow of water along the bottom of the tank and up into the tube and hose for discarding the sediment and impurities. Other objects of the invention include an apparatus for separating the sediment and impurities from the underlying gravel floor and sweeping them from the floor and other places of higher concentration to clean the aquarium tank with efficiency and dispatch; an apparatus for cleaning, draining and refilling the aquarium tank where the gravel remains on the floor of the tank and is prevented from entering the tube or any portion of the apparatus; an apparatus that allows the operator to move the gravel about, to cause separation of sediment and impurities therefrom, and removal of the sediment and impurities without the need to constantly adjust the flow of water into the tube; an apparatus for cleaning an aquarium tank where the agitation of the gravel particles is maintained along the floor of the tank in the presence of a continuous flow of water up the tube and out the hose to draw out all sediment and impurities that are stirred up by the cleaning action; an apparatus that allows faster cleaning of aquarium tanks than apparatuses in the prior art so that water is saved in the aquarium tank and the requirement for new water in the tank is curtailed such that the burden on the environment is substantially lessened; and, an apparatus that may be used by persons of lesser skill than those using the prior art devices so that additional training is not required.

These and other objects of the invention may be determined by reading the following Description of the Preferred Embodiments taken together with the drawings appended hereto. The scope of protection sought by the inventor may be gleaned from a fair reading of the claims that conclude this specification.

DESCRIPTION OF THE PREFERRED EMBODIMENTS

Figures 1, 4:
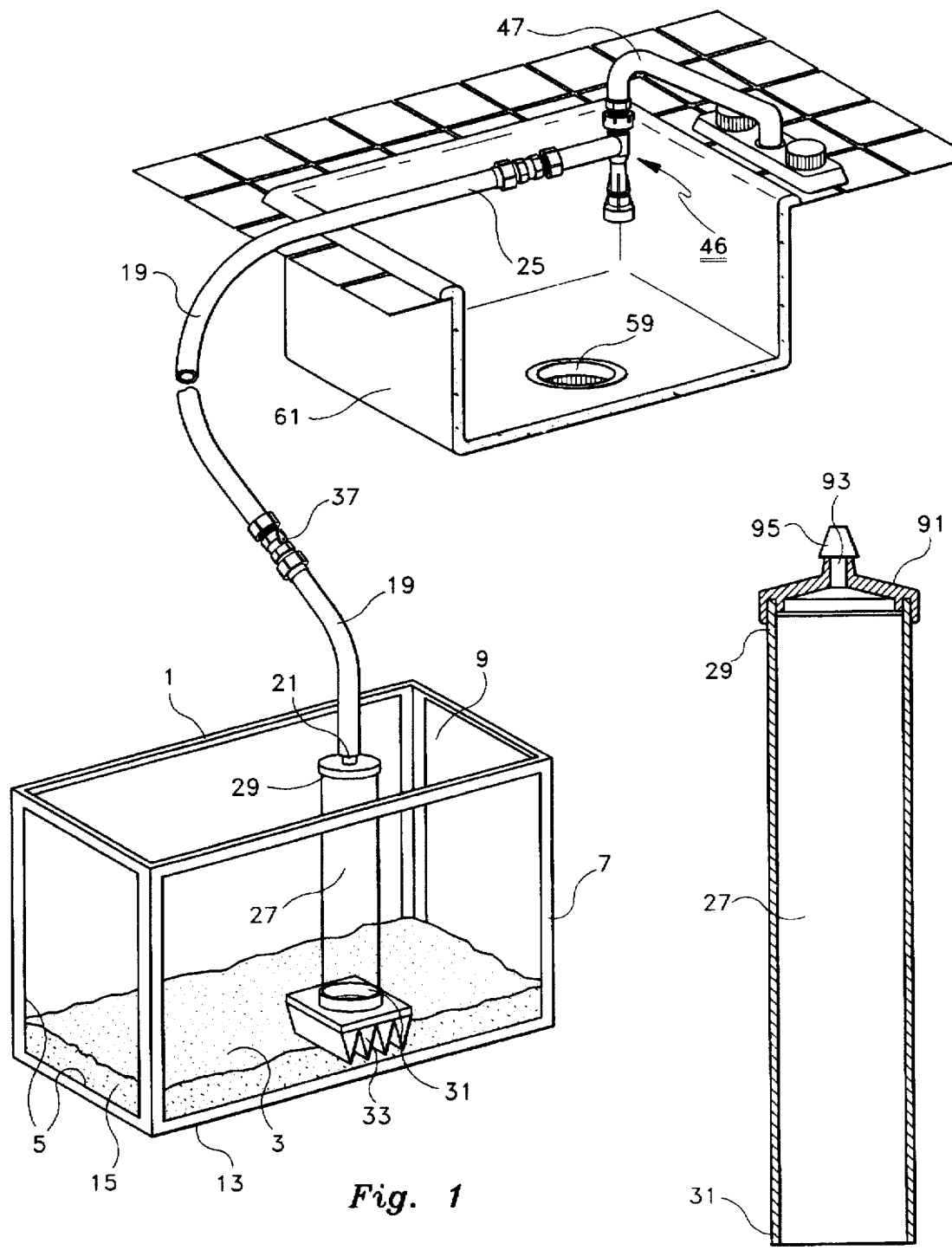
FIG. 1 is a perspective view of one embodiment of the apparatus of this invention shown in use with a typical faucet pump with an aquarium tank.
FIG. 4 is an enlarged cross-sectional elevation view of the tube interposed between the flexible hose and the grille for use in the embodiments shown in FIGS. 1, 2 and 3.
Figure 2:
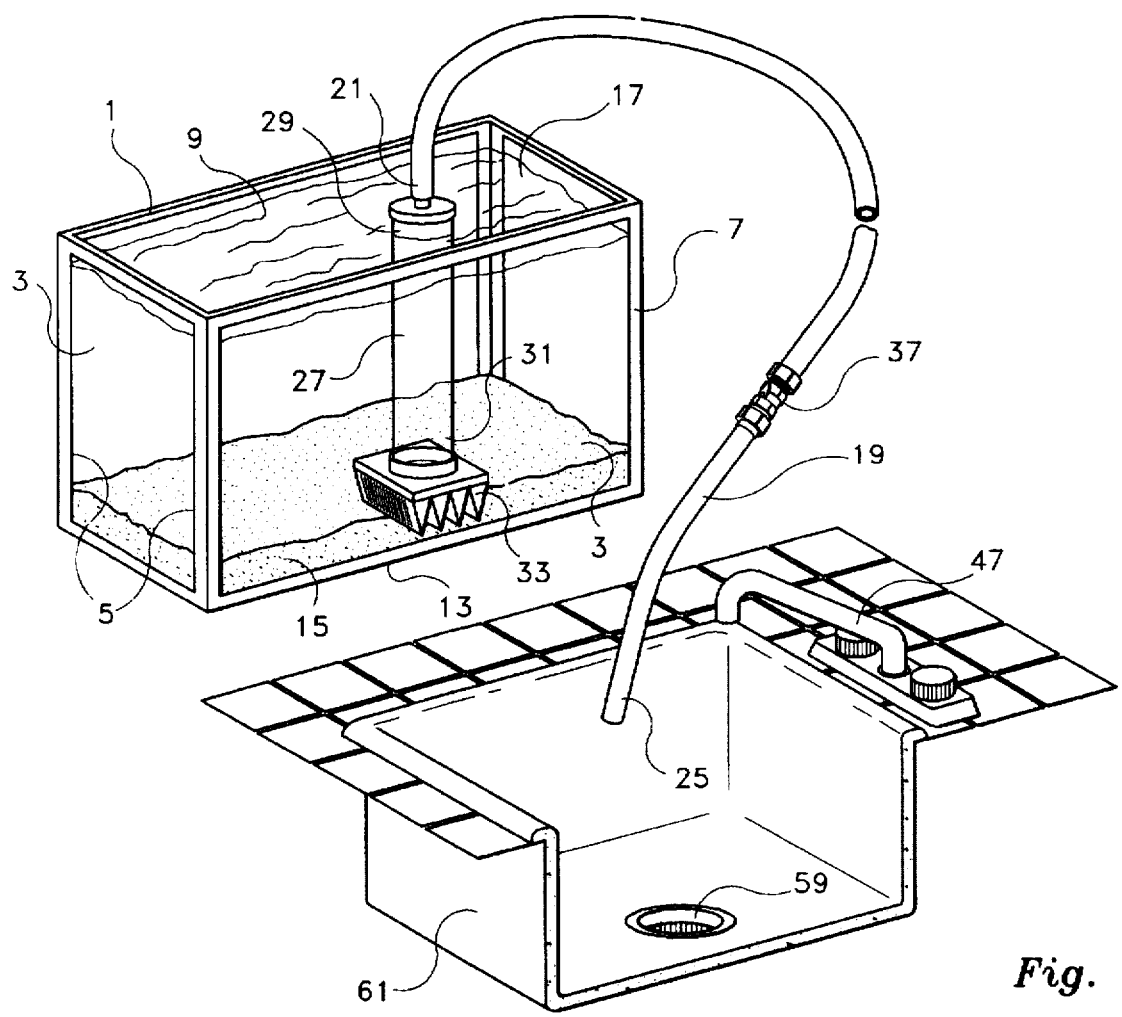
FIG. 2 is a perspective view of another embodiment of the apparatus of this invention shown in use in a siphon mode with an aquarium tank.

Turning now to the drawings, where like elements are identified by like numbers throughout the 15 figures, FIGS. 1 and 2 show a typical aquarium tank 1 comprising spaced-apart glass or clear plastic sides 3 extending vertically upward from a flat bottom (not shown) and held together in a watertight configuration along their respective side edges 5 by a metal frame 7. Aquarium 1 has an open top 9 and a floor 13 covered with a layer of gravel 15 and filled with water 17 and including flora and fauna (not labelled).

In many cases, there is a flat plate set under the gravel that supports what is known as an "under-gravel" filter. Fish droppings and other debris naturally fall or sink to the gravel and become intermeshed therewith. If not periodically removed from the gravel, the droppings and other debris will sour the entire environment and place a stress on the inhabitants therein. In addition, there will be a significant amount of toxic solubilized materials formed in the water layer adjacent the gravel and this must be removed to retain comfort in the water.

As shown in FIGS. 1 and 2, an elongated flexible hose 19 is provided having first and second opposite ends 21 and 25, respectively. A tube 27 is also provided that includes an upper distal end 29 for connection to first end 21 of flexible hose 19. The other or lower distal end 31 of tube 27 is to be attached to a grille 33 and said grille and tube end 31 are immersed in water 17. Grille 33 will be described in detail later in this specification.

Figure 5:
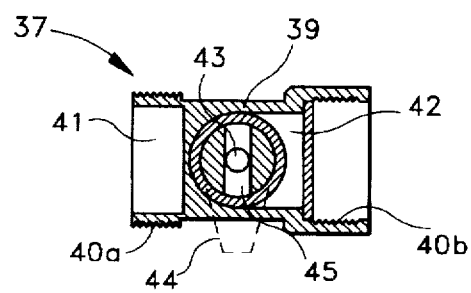
FIG. 5 is an enlarged cross-section view of a typical flow control valve that may be used in the apparatus shown in the embodiments shown in FIGS. 1, 2 and 3.
Figure 9:
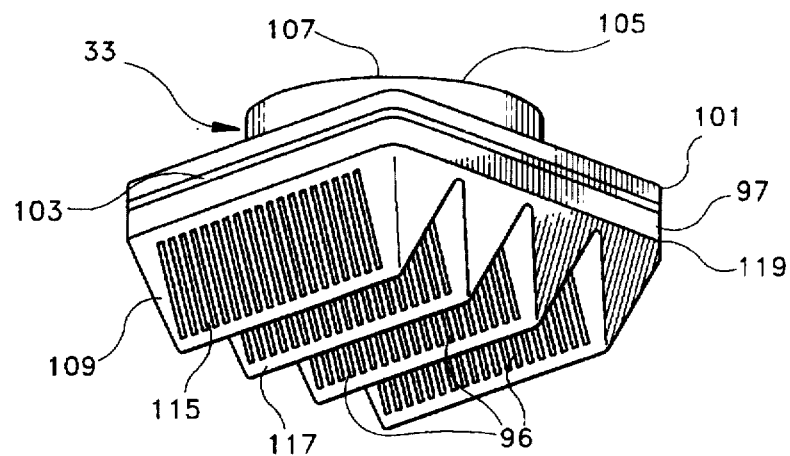
FIG. 9 is a perspective view of the preferred embodiment of the grille of this invention.
Figure 10:
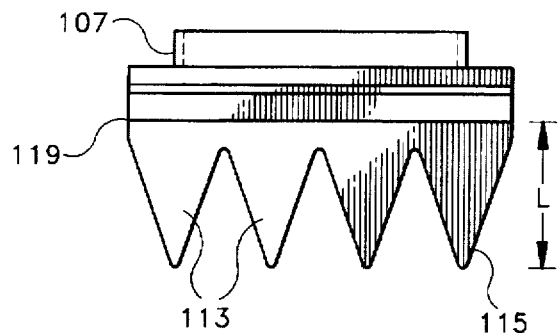
FIG. 10 is a side elevational view of the embodiment shown in FIG. 9.
Figure 11:
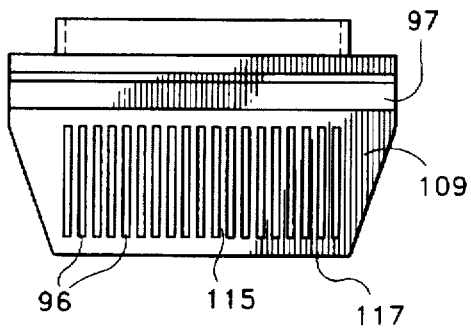
FIG. 11 is a front elevational view of the embodiment shown in FIG. 9.
Figure 12:
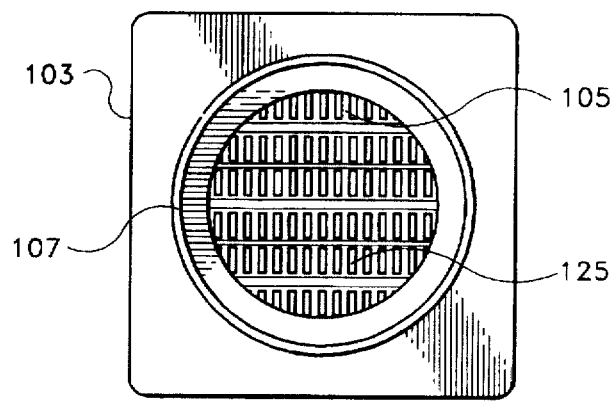
FIG. 12 is a top view of the embodiment shown in FIG. 9.

In the embodiment shown in FIG. 1, flexible hose 19 is interconnected, intermediate its ends 21 and 25, to an optional flow control valve 37 to control the flow of water passing through hose 19. As shown in FIG. 5, flow control valve 37 comprises a valve body 39, including hose receptacles 40a and 40b having formed thereacross a flow bore 41 for flow of water between hose connections 40a and 40b set on opposite sides of body 39. A valve bore 42 is formed cross-ways in body 39 into which is pivotally positioned a valve stem 43 having a turnable handle 44 at one end and a cross-bore 45 formed transversely thereacross to align with said flow bore 41 in various positions to allow a flow of water thereacross as determined by the position of handle 44.

Figure 6:
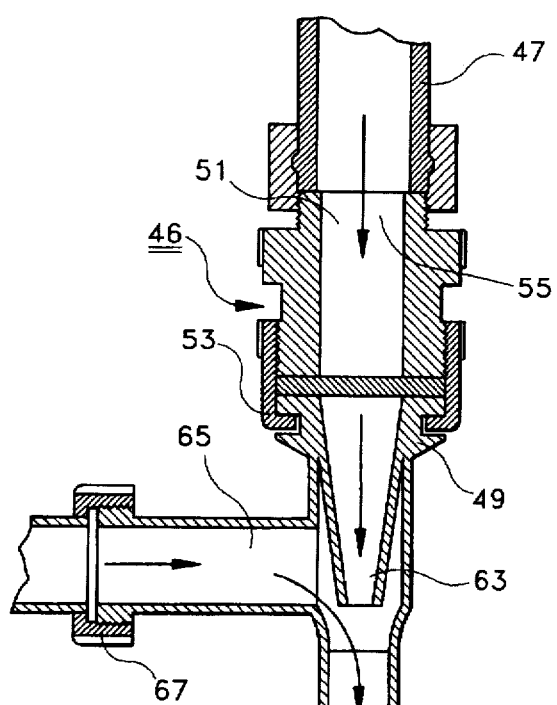
FIG. 6 is an enlarged cross-section elevational view of a faucet pump embodied in the apparatus illustrated in FIG. 1 and with the faucet pump flow control arrangement positioned such that water will flow to the drain.

As shown in FIG. 1, in the first embodiment of this invention, flexible hose second end 25 is attached to a first means 46 for connection to a flowing water source, such as a faucet 47, that can draw water through hose 19. Means 46 is shown in greater detail in FIG. 6 and shows it to comprise a base 49, containing a main faucet water transfer tube 51, with a surrounding cap 53 for attaching the top end 55 of said tube in axial, watertight alignment with the outlet of faucet 47 for directing a flow of faucet water downward, through said tube and out the bottom end 57 thereof toward a drain 59 located in a sink 61. Tube 51 includes a narrower diameter section 63, intermediate tube ends 55 and 57, for decreasing the diameter of the stream of water passing downward therethrough. A side tube 65 is formed in base 49 and contains a surrounding cap 67 for connection to flexible hose second end 25. The introduction of side tube 65 is transverse to the axis of main faucet water transfer tube 51 and near the area of the narrower flow to take advantage of the venturi effect caused by this narrower area of flow. Base 49 also includes a bottom tube section 69 of wider diameter than the venturi section for carrying both faucet water and, when desired, aquarium tank water with its entrained sediment and impurities, downward through bottom tube end 57 into drain 59.

Figure 7:
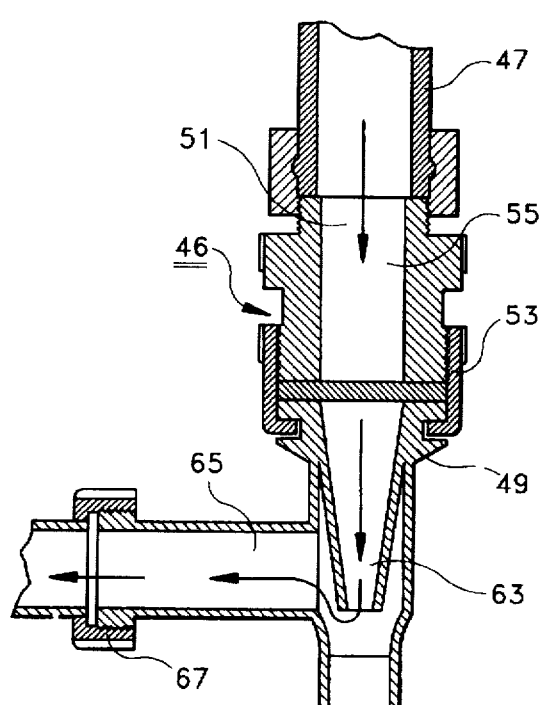
FIG. 7 is a view similar to FIG. 6 and showing the faucet pump-flow control arrangement positioned such that water will flow from the faucet into the aquarium tank.
Figure 8:
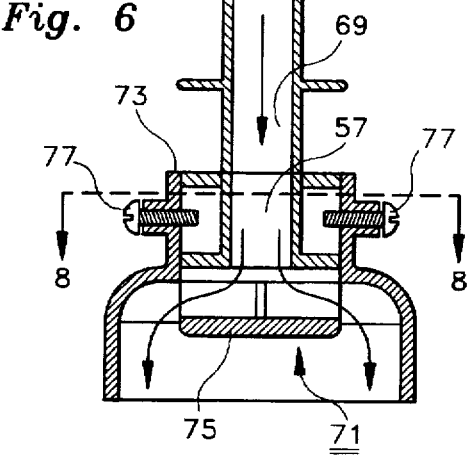
FIG. 8 is a cross-section view taken along lines 8—8 in FIG. 6.

This first embodiment may be joined with a second means 71 for causing selective and alternative flow of water from aquarium tank 1 through tube 27 and elongated flexible hose 19 to drain 59 and, in addition, a flow of water from faucet 47 through hose 19 and tube 27 for refilling aquarium tank 1. This second means 71 is shown in greater detail in FIGS. 6, 7 and 8 and shows a valve 73 mounted to tube bottom end 57. Valve 73 includes a shut-off plate 75 transversely mounted by two screws 77 for manual, reciprocal motion from a first position, shown in FIG. 6, spaced-apart from tube end 57 (allowing water to flow through tube bottom end 57) to a second position, shown in FIG. 7, abutted against tube end 57 (diverting water upward from tube bottom end 57 to flow out side tube 65).

As shown in FIG. 2, in the second embodiment of this invention, the second end 25 of flexible hose 19 is placed below the level of tank gravel 15, such as into sink 61 containing drain 59. In this configuration, a natural siphoning action may be started, by simply causing a partial vacuum in hose 19, whereby the difference in atmospheric pressure on the surface of water 17 and at flexible hose second end 25 will support a flow of aquarium water out of tank 1 and into sink 61. In this configuration, water may be obtained for filling aquarium tank 1 by attaching flexible hose end 25 directly to water faucet 47 after the draining operation is completed.

Figure 3:
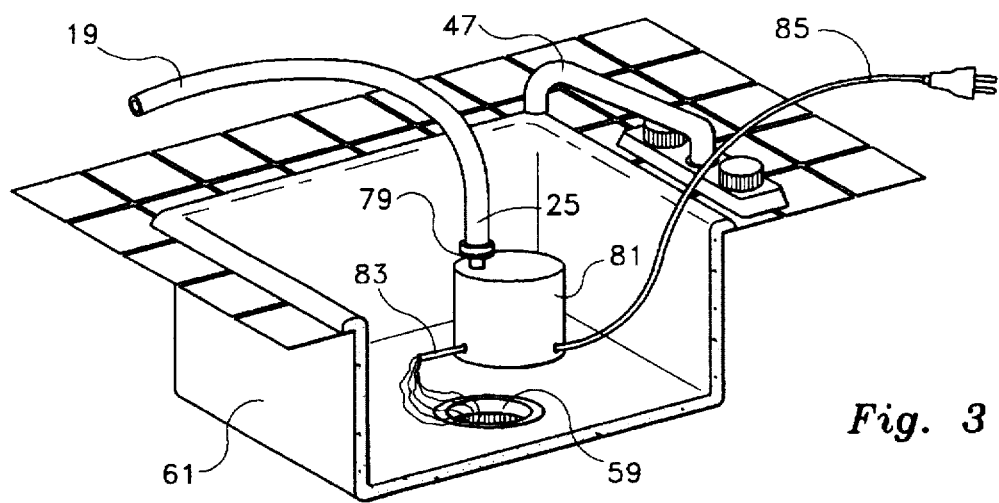
FIG. 3 is a partial perspective view of another embodiment of the apparatus of this invention shown in use with a typical water displacement pump to pump water, sediment and impurities out of an aquarium tank.

As shown in FIG. 3, in the third embodiment of this invention, flexible hose second end 25 is connected to the inlet 79 of a typical water pump 81 of the type that can pump water out of aquarium tank 1, such as by suction, displacement, turbine action and the like. As shown in FIG. 3, pump 81 is a common displacement type electrical pump containing a vibration unit inside which causes suction at top inlet 79 and pumps water (with sediment and impurities) from tank 1 out through the pump bottom outlet 83. Pump 81 obtains electrical power through electrical line 85 to pump water from tank 1 to drain 59 in sink 61.

Tube 27 is shown in detail in FIG. 4 and shows upper distal end 29 closed over by a tight fitting cap 91 that has a bore 93 formed therethrough and a surrounding flared stub 95 adaptable for attaching tube upper distal end 29 to flexible hose first end 21. Tube 27 may take on a variety of configurations. It is not necessary that it be larger in diameter than flexible hose 19; in fact, it may be the same or smaller in diameter. It may also be made in separate pieces or lengths that may be connected end-to-end to provide a tube of adjustable length for use in small, as well as large (and deep), aquariums as is already known in the prior art. It may be opaque or transparent and it may be made of metal or plastic. And, it may be coupled to a handle; however, for the most part, one can use the upper part of tube 27 as its own handle.

As shown in FIGS. 9–12, grille 33 is formed with a plurality of small apertures 96 that are narrower than the width of the gravel particles at the bottom of the aquarium tank. When grille 33 is moved into contact with the gravel, apertures 96 are of a size to allow passage of water, sediment and impurities therethrough but are not so large as to allow passage of gravel particles therethrough. As further shown, grille 33 of this invention comprises a planar base frame 97 defined by sides, such as rectangular sides 101 that form a perimeter 103 thereabout. An opening 105 is formed in frame 97, preferably centrally therein, about which, on one side of frame 97, is located a collar 107 for attachment to tube lower distal end 31. It is preferred that collar 107 be attached about the entire opening in tube lower distal end 31. The attachment may be permanent, such as by using a thin film of adhesive between collar 107 and tube end 31 or may be removeably attached such as by making collar 107 frictionally tight fitting about tube end 31.

A plurality of support arms 109 extends from base frame 97 on the opposite side of said frame from the connection to tube 27, said arms 109 extending in convergent manner to form a plurality of tooth-shaped lattices 113. As shown in FIGS. 9–12, lattices 113 are formed in teeth-shape and are arranged parallel to each other. One or more screens 115, having said apertures 96 formed therethrough, are formed over lattices 113 to create the gravel contact surface of grille 33. Each tooth-shaped screen 115 is further defined by a bottom support 117 and a top perimeter 119 attached to frame 97. The distance between bottom supports 117 and their respective top perimeters 119 of each tooth-shaped screen is labeled "L".

As further shown in FIGS. 9–12, the preferred embodiment of this invention is shown where screen 115, lattices 113, and support arms 109 are made in one monolithic unit such as by injection molding. In addition, while apertures 96 may be in the form of mere holes, the preferred embodiment of said apertures is a plurality of slots 96, arranged in side-by-side position, formed in screens 115, that extend from near bottom support 117 to near top perimeter 119 and of a width sufficient to pass sediment and impurities from outside grille 33 to inside the interior chamber 125, formed by screens 115 and base frame 97 that defines grille 33. Other forms of apertures are fully contemplated in this invention such as holes, round or otherwise.

Figure 13A:
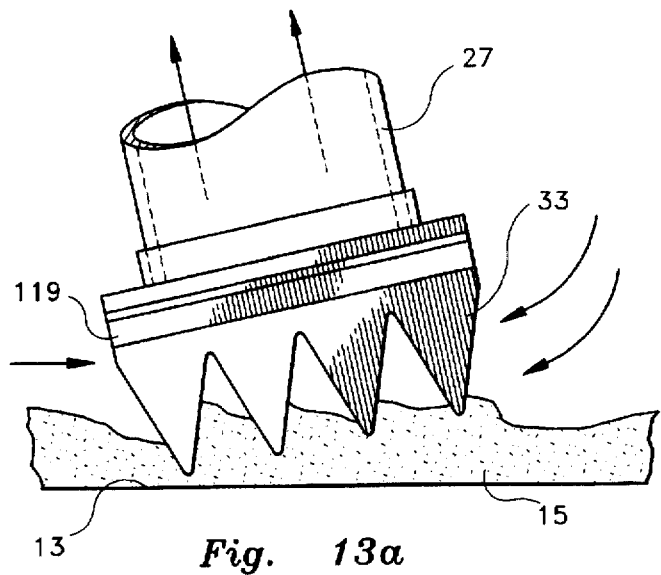
FIGS. 13a, 13b, and 13c are illustrative drawings showing how the grille of this invention insures a continuous flow of water up through the tube no matter in what position the grille is embedded in the gravel at the bottom of the aquarium tank.
Figure 13B:
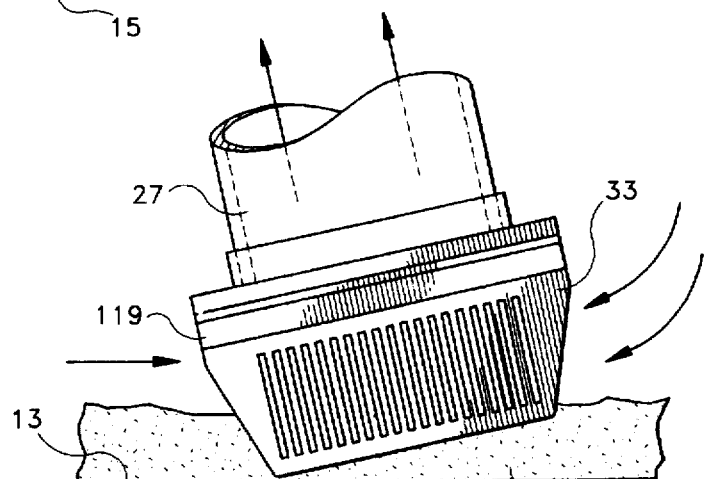
Figure 13C:
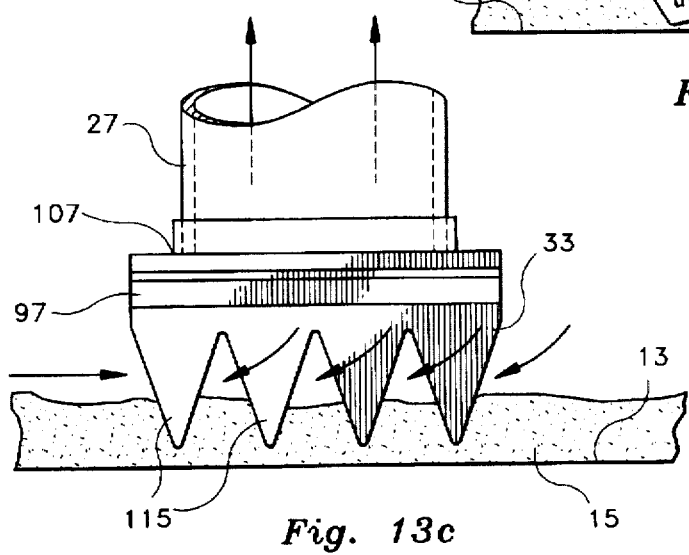

As shown in FIGS. 13a–13c, it is preferred that tooth-shaped screens 115 are formed in a plurality wherein they are spaced from each other a distance such that a portion of one said screen is always exposed to water in the tank regardless of the position of said other screen. Two such tooth-shaped screens 115 would fill this requirement, however, for molding, internal strength, and other considerations, the plurality shown in FIGS. 13a–13c are considered preferred.

The length "L" of tooth-shaped screens 115 is set noticeably longer than the depth of gravel normally encountered on the floor of aquarium tanks. This is to allow a continuous flow of tank water into interior chamber 125 while grille 33 is in contact with the gravel to aid in sweeping the sediment and impurities in through said apertures 96 into chamber 125, up tube 27 and through hose 19 to the drain. This unique aspect of the invention is shown in FIGS. 13a, 13b, and 13c, namely that no matter how tube 27 is tilted or angled, grille 33 still maintains part of screens 115 above and out of contact with the gravel to allow a constant flow of water therethrough and upward through tube 27 and hose 19 to the drain.

This action of causing the gravel particles to bump and rub together outside the tube is totally different from Reyniers' patent where the flow of water into the lower end of the gravel tube must be maintained at a critical value i.e., sufficient to cause gravel to be drawn into the gravel tube, and not strong enough to have the gravel pass further upward into flexible hose 19. Such criticality in Reyniers has led to poor acceptance of this practice. In the instant invention, all the bumping and grinding ("churning") of the gravel takes place outside the tube.

When using the embodiment shown in FIG. 1, with first and second means 46 and 71, base 49 is fastened to faucet 47 and flexible hose second end 25 attached to side tube 65 and the faucet turned on to create a vacuum in flexible hose 19. Flow control valve 37 is adjusted to the desires of the operator and then the operator presses slightly downward on tube 27 to force grille 33 into contact with the gravel on the bottom of tank 1. The operator moves grille 33 about, alternately plowing up and smoothing down gravel while causing the gravel particles to bump against each other and their respective outer surfaces to grind together to dislodge the sediment and the impurities that have gathered along the bottom of tank 1 in the gravel. The flow of water into chamber 125, grille 33, tube 27 and out hose 19 into drain 59 will carry sediment and impurities with it.

When using the embodiment shown in FIG. 2, flexible hose second end 25 is placed lower than first end 21 and a small amount of suction is started in flexible hose 19, such as by using a "squeeze ball" type pump or by sucking on hose end 25. A natural siphon action is thereby started and the aquarium water, with entrained sediment and impurities, is removed from the tank through chamber 125, grille 33, tube 27, and flexible hose 19 by this siphon action.

When using the embodiment shown in FIG. 3, flexible hose second end 25 is attached to inlet 79 of water displacement pump 81 and electrical power delivered through electrical line 85 to start the pump action and draw water in through chamber 125, grille 33, up tube 27, through flexible hose 19, through pump 81 and out pump outlet 83 to drain 59.

After the operator has removed about one-third of the water from tank 1, (s)he either turns off flow control valve 37 and works in the partially emptied aquarium tank, or, in the case of the invention shown in FIG. 1, closes shut-off valve 73 so that shut-off plate 75 is moved to its second position, against tube bottom end 57, to force the flow of faucet (fresh) water into side tube 65, hose 19, tube 27 and out grille 33 to refill aquarium tank 1.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same results are within the scope of this invention.

What is claimed is:

1. A method of draining a portion of the water from an aquarium tank having a tank floor covered with gravel to a predetermined depth and with it the sediment and impurities that have gathered with the gravel in the bottom of the tank comprising the steps of:

a) providing a flexible hose having first and second opposite ends;

b) providing a tube having upper and lower distal ends and connecting said upper distal end thereof to said first end of said elongated flexible hose;

c) providing a grille defined by a plurality of three-dimensional tooth-shaped lattices and screens covering said lattices, said screens having apertures formed therethrough of a size to allow passage therethrough of water, sediment and impurities but not gravel, and connecting said grille to said lower distal end of said tube;

d) immersing said tube and said grille into the aquarium tank such that said grille may be placed in contact with the gravel at the bottom of the aquarium tank, e) creating a flow of water from the tank through said apertures into said grille, said tube, and said flexible hose to drain water, sediment and impurities therethrough;

f) moving said grille about the gavel at the bottom of the aquarium tank such that the gravel particles are forced by said movement to bump and rub against each other, outside said tube, to dislodge the sediment and impurities that have gathered therewith; and, g) discharging said water, sediment and impurities from the aquarium tank.

2. The method of claim 1 wherein the step of creating a flow of water from the tank through said grille, said tube, and said flexible hose to drain water, sediment and impurities therethrough includes the additional step of:

a) connecting said second flexible hose end to a faucet through a means providing suction when the faucet is opened to allow water to pass therethrough; and, b) opening the faucet to provide a flow of water therethrough and suction to said flexible hose to create the flow of water from the tank.

3. The method of claim 1 wherein the step of causing a flow of water from the tank through said grille, said tube, and said flexible hose to drain water, sediment and impurities therethrough includes the step of lowering said second end of said flexible hose below the level of the bottom of the aquarium tank and starting a natural siphon flow of water therethrough.

4. The method of claim 1 wherein the step of causing a flow of water from the tank through said grille, said tube, and said flexible hose to drain water, sediment and impurities therethrough includes the steps of:

a) providing a water pump, having an inlet and an outlet;

b) connecting said pump inlet to said second end of said elongated flexible hose and turning on the pump to provide pumping action to draw water, sediment and impurities from the aquarium tank, through said grill, said tube, and said flexible hose; and, c) discharging said water, sediment and impurities through said pump outlet exterior the tank.

5. Apparatus for use in draining, cleaning and refilling an aquarium tank having a floor covered with gravel to a predetermined depth comprising:

a) an elongated flexible hose having first and second opposite ends;

b) a tube including an upper distal end for connection to said first end of said flexible hose, and a lower distal end adapted to be immersed in the aquarium tank such that said lower end may be placed near the gravel;

c) a first means attachable to said second end of said flexible hose and for connection to a flowing water source for creating a continuous flow of water from tank through said tube and said flexible hose;

d) a grille, covering said lower distal end of said tube, and including a chamber surrounded by three-dimensional tooth-shaped lattices having screens covering said lattices, said screens having a plurality of apertures formed therethrough that are narrower than the width of the gravel particles covering the floor of the aquarium, said grille arranged for contact with the gravel for moving the gravel about the floor of the tank such that the gravel particles are forced by said movement to bump and rub against each other outside said tube to dislodge the sediment and impurities that have gathered therewith, and wherein said sediment and impurities are swept by said water flow through said apertures into said chamber, up said tube and through said hose for discard without the entrance of gravel into said tube or hose; and, e) wherein at least one of said lattices being of a height greater than the depth of the floor-covering gravel so as to always present a portion of said apertured screen to the aquarium water above the gravel to allow a continuous flow of water into said tube to sweep the debris, that passes into said tube through said apertures, out of the aquarium.

6. The apparatus of claim 5 wherein said first means comprises:

a) a base containing a main faucet water transfer tube having spaced-apart top and bottom terminal ends, including a cap for attaching said top end of said tube in axial, watertight alignment with the outlet of a standard faucet for directing a flow of faucet water downward, through said tube and out said bottom end thereof toward a drain;

b) said transfer tube having a narrower diameter section intermediate said terminal ends for providing a venturi effect; and, c) a side tube interconnected said main faucet water transfer tube, in the area of said narrower diameter, and containing means for attaching one end of said flexible hose thereto.

7. The apparatus of claim 5 further including a second means for causing selective and alternative flow of water from the aquarium tank through said tube and said elongated flexible hose to drain water from the tank and, in addition, causing a flow of water from said flowing water source through said hose and said tube for refilling the aquarium tank.

8. The apparatus of claim 7 wherein said first and second means comprise:

a) a base containing a main faucet water transfer tube having spaced-apart top and bottom terminal ends, including a cap for attaching said top end of said tube in axial, watertight alignment with the outlet of a standard faucet for directing a flow of faucet water downward, through said tube and out said bottom end thereof, toward a drain;

b) said transfer tube having a narrower diameter section intermediate said terminal ends for providing a venturi effect;

c) a side tube interconnected said main faucet water transfer tube, in the area of said narrower diameter, and containing means for attaching one end of said flexible hose thereto; and, d) a valve mounted to said tube bottom end including a shut-off plate transversely mounted for reciprocal motion from a first position apart from said bottom tube end, for permitting passage therethrough of faucet water, sediment, and impurities along with the aquarium tank water, and a second position against said bottom tube end, for shutting off the flow of water therethrough and diverting faucet water out said side tube through said flexible hose into said tube and into the aquarium.

9. The apparatus of claim 5 wherein said tube is formed of separate pieces that may be attached together in end-to-end fashion.

10. The apparatus of claim 5 wherein said tube is greater in diameter than said flexible hose.

11. The apparatus of claim 5 wherein said tube is the same diameter as said flexible hose.

12. The apparatus of claim 5 wherein said grille is attached to said bottom end of said tube across the full open end of said tube.

13. The apparatus of claim 5 wherein said grille is permanently attached to said bottom end of said tube.

14. The apparatus of claim 5 wherein said grille is removeably attached to said bottom end of said tube.

15. The apparatus of claim 5 wherein said grille is molded in a monolithic unit.

16. The apparatus of claim 5 wherein said screens are formed parallel to each other.

17. Apparatus for use in draining, cleaning and refilling an aquarium tank having a tank floor covered with gravel to a predetermined depth comprising:
   a) an elongated flexible hose having first and second opposite ends;
   b) a tube including an upper distal end for connection to said first end of said flexible hose, and a lower distal end adapted to be immersed in the aquarium tank such that said lower end may be placed near the gravel, said hose and said tube of such length to allow said second flexible hose end to be placed below the level of water in the tank and a partial vacuum to be started to create a natural siphon action to create a flow of water from the tank through said tube and through said flexible hose;
   c) a grille, covering said lower distal end of said tube, and including a chamber surrounded by three-dimensional tooth-shaped lattices having screens covering said lattices, said screens having a plurality of apertures formed therethrough that are narrower than the width of the gravel particles covering the floor of the aquarium, said grille arranged for contact with the gravel for moving the gravel about the floor of the tank such that the gravel particles are forced by said movement to bump and rub against each other outside said tube to dislodge the sediment and impurities that have gathered therewith, and wherein said sediment and impurities are swept by said water flow through said apertures into said chamber, up said tube and through said hose for discard without the entrance of gravel into said tube or hose; and,
   d) wherein at least one of said lattices being of a height greater than the depth of the floor-covering gravel so as to always present a portion of said apertures, screen to the aquarium water above the gravel to allow a continuous flow of water into said tube to sweep the debris, that passes into said tube through said apertures, out of the aquarium.

18. The apparatus of claim 17 wherein said tube is formed of separate pieces that may be attached together in end-to-end fashion.

19. The apparatus of claim 17 wherein said tube is greater in diameter than said flexible hose.

20. The apparatus of claim 17 wherein said tube is the same diameter as said flexible hose.

21. The apparatus of claim 17 wherein said grille is attached to said bottom end of said tube across the full open end of said tube.

22. The apparatus of claim 17 wherein said grille is permanently attached to said bottom end of said tube.

23. The apparatus of claim 17 wherein said grille is removeably attached to said bottom end of said tube.

24. The apparatus of claim 17 wherein said grille is molded in a monolithic unit.

25. The apparatus of claim 17 wherein said screens are formed parallel to each other.

26. Apparatus for use in draining, cleaning refilling an aquarium tank having a tank floor covered with gravel to a predetermined depth comprising:
   a) an elongated flexible hose having first and second opposite ends;
   b) a tube including an upper distal end for connection to said first end of said flexible hose, and a lower distal end adapted to be immersed in the aquarium tank such that said lower end may be placed near the gravel, said hose and said tube of such length to allow said second flexible hose end to be placed below the level of water in the tank and a partial vacuum to be started to create a natural siphon action to create a flow of water from the tank through said tube and through said flexible hose;
   c) a water pump, including a pump inlet for connection to said flexible hose second end, for drawing water through said hose out of the tank;
   d) a grille, covering said lower distal end of said tube, and including a chamber surrounded by three-dimensional tooth-shaped lattices having screens covering said lattices, said screens having a plurality of apertures formed therethrough that are narrower than the width of the gravel particles covering the floor of the aquarium, said grille arranged for contact with the gravel for moving the gravel about the floor of the tank such that the gravel particles are forced by said movement to bump and rub against each other outside said tube to dislodge the sediment and impurities that have gathered therewith, and wherein said sediment and impurities are swept by said water flow through said apertures into said chamber, up said tube and through said hose for discard without the entrance of gravel into said tube or hose; and,
   e) wherein at least one of said lattices being of a height greater than the depth of the floor-covering gravel so as to always present a portion of said apertured screen to the aquarium water above the gravel to allow a continuous flow of water into said tube to sweep the debris, that passes into said tube through said apertures, out of the aquarium.

27. The apparatus of claim 26 wherein said tube is formed of separate pieces that may be attached together in end-to-end fashion.

28. The apparatus of claim 26 wherein said tube is greater in diameter than said flexible hose.

29. The apparatus of claim 26 wherein said tube is the same diameter as said flexible hose.

30. The apparatus of claim 26 wherein said grille is attached to said bottom end of said tube across the full open end of said tube.

31. The apparatus of claim 26 wherein said grille is permanently attached to said bottom end of said tube.

32. The apparatus of claim 26 wherein said grille is removeably attached to said bottom end of said tube.

33. The apparatus of claim 26 wherein said grille is molded in a monolithic unit.

34. The apparatus of claim 26 wherein said screens are formed parallel to the other.

* * * * *